US010500748B2

(12) United States Patent
Pesavento et al.

(10) Patent No.: US 10,500,748 B2
(45) Date of Patent: Dec. 10, 2019

(54) CHEMICALLY SHARPENED BLADES

(71) Applicant: Hutchinson Technology Incorporated, Hutchinson, MN (US)

(72) Inventors: Paul V. Pesavento, Hutchinson, MN (US); Peter F. Ladwig, Hutchinson, MN (US); Michael W. Davis, Rockford, MN (US); John A. Theget, Hutchinson, MN (US); Kurt C. Swanson, Chippewa Falls, WI (US); Joel B. Michaletz, Litchfield, MN (US); Philip W. Anderson, Dassel, MN (US); Timothy A. McDaniel, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 15/057,674

(22) Filed: Mar. 1, 2016

(65) Prior Publication Data

US 2016/0257006 A1 Sep. 8, 2016

Related U.S. Application Data

(60) Provisional application No. 62/127,083, filed on Mar. 2, 2015.

(51) Int. Cl.
*B26B 9/00* (2006.01)
*C23F 1/00* (2006.01)
(Continued)

(52) U.S. Cl.
CPC .............. *B26D 1/0006* (2013.01); *B26B 9/00* (2013.01); *B26B 9/02* (2013.01); *C23F 1/04* (2013.01); *B26D 2001/0053* (2013.01)

(58) Field of Classification Search
CPC .. B26B 9/00; B26B 9/02; B26D 1/006; B26D 2001/0053
See application file for complete search history.

(56) References Cited

U.S. PATENT DOCUMENTS 3,035,344 A * 5/1962 Brown ...................... B26B 9/00 30/115
3,696,013 A 10/1972 Tafapolsky
(Continued)

FOREIGN PATENT DOCUMENTS

EP 1284833 B1 7/2010
WO WO03066277 A1 8/2003

OTHER PUBLICATIONS

Ladwig, Peter F. Sharp Edge Formation Using a Chemical Etching Process. Research Disclosure, Hutchinson Technology Incorporated 566007, May 4, 2011, 1 page.
(Continued)

*Primary Examiner* — Stephen Choi
(74) *Attorney, Agent, or Firm* — DLA Piper LLP (US)

(57) ABSTRACT

A chemically etched cutting tool includes a metal base having a first side and a second side, and a chemically etched blade on at least one side of the metal base, the chemically etched blade forming a cutting edge at the intersection of the first side of the chemically etched blade and the second side of the chemically etched blade. The first side of the chemically etched blade includes one or more concave portions and one or more convex portions with at least one inflection point between the concave portions and one or more convex portions. The second side of the chemically etched blade includes one or more concave portions and one or more convex portions with at least one inflection point between the concave portions and one or more convex portions.

15 Claims, 15 Drawing Sheets

(51) Int. Cl.

| | |
|---|---|
| ***B26D 1/00*** | (2006.01) |
| ***B26B 9/02*** | (2006.01) |
| ***C23F 1/04*** | (2006.01) |

(56) References Cited

U.S. PATENT DOCUMENTS

| | | | | |
|---|---|---|---|---|
| 4,793,218 | A | 12/1988 | Jordan et al. | |
| 4,823,467 | A * | 4/1989 | Campbell | B26B 9/02 30/355 |
| 5,317,938 | A * | 6/1994 | de Juan, Jr. | A61B 17/32 76/104.1 |
| 5,693,454 | A | 12/1997 | Munoz | |
| 5,842,387 | A * | 12/1998 | Marcus | B23P 15/40 76/104.1 |
| 6,500,187 | B1 | 12/2002 | Petersen | |
| 8,061,237 | B2 | 11/2011 | Hobbs et al. | |
| 8,322,253 | B2 | 12/2012 | Howells | |
| 9,844,888 | B2 | 12/2017 | Pesavento et al. | |
| 2005/0115084 | A1* | 6/2005 | Hasegawa | B26B 9/02 30/355 |
| 2005/0161429 | A1 | 7/2005 | Sauciunac | |
| 2010/0140212 | A1* | 6/2010 | Li | A47J 43/25 216/11 |
| 2016/0257011 | A1 | 9/2016 | Pesavento et al. | |
| 2018/0104837 | A1 | 4/2018 | Pesavento et al. | |

OTHER PUBLICATIONS

Mantra Public Relations. “Cutting Edge Technology Gets Even Sharper.” New York, NY, Jun. 28, 2010, 2 pages.

Precision Micro. New Approach to Medical Saw Blade Production [online], Aug. 28, 2013 [retrieved on Sep. 13, 2016]. Retrieved from the Internet <https://www.mdtmag.com/news/2013/08/new-approach-medical-saw-blade-production>, 3 pages.

Notice of Allowance in U.S. Appl. No. 15/057,541, dated Aug. 11, 2017.

Office Action in U.S. Appl. No. 15/057,541, dated Feb. 10, 2017.

Office Action in U.S. Appl. No. 15/845,351, dated Nov. 19, 2018.

Office Action in U.S. Appl. No. 15/845,351, dated Apr. 30, 2019.

* cited by examiner

CHEMICALLY SHARPENED BLADES

CROSS REFERENCE TO RELATED APPLICATIONS

This application claims the benefit of U.S. Provisional Application No. 62/127,083, filed on Mar. 2, 2015, titled CHEMICALLY SHARPENED BLADES, which is incorporated by reference herein in it its entirety and for all purposes.

FIELD OF THE INVENTION

The invention relates generally to manufacture of cutting blades, and more particularly, but without limitation to manufacture of metal cutting blades.

BACKGROUND

Metal cutting tools are used in a variety of applications. In such applications, the sharpness and durability of the blade of the cutting tool is desirable to achieve and maintain high cutting performance over many cutting cycles. A blade that is too thin may initially be very sharp, but the thinness of the blade undermines its durability and the blade quickly becomes dull. For example, the resistance to dulling is dependent on cutting edge angle in the distal 0.001 inch of the blade. Relatively larger cutting edge angles perform much better. An ideal blade balances sharpness with durability. Such balancing is dependent on the process used to form the blade. A preferred process reliably forms a blade having an ideal balance of sharpness and durability. A preferred process is also economical. These and other aspects of blade manufacturing are addressed herein.

SUMMARY

As described herein, the manufacture of cutting blades may include chemical etching to form the cutting edge of the blade. Chemical etching techniques for forming cutting blades include the use of a variable permeability mask to form a beveled surface in a component, such as a metal base to create or finish a cutting edge. A cutting edge of a cutting tool may be formed from the edge of a beveled surface or the intersection of two beveled surfaces. Material removal and angles of beveled surfaces can be controlled by the configuration of the variable permeability mask as well as etching parameters such as base material, etchant solution, time and temperature.

In one example, this disclosure is directed to a chemically etched cutting tool includes a metal base having a first side and a second side, and a chemically etched blade on at least one side of the metal base, the chemically etched blade forming a cutting edge at the intersection of the first side of the chemically etched blade and the second side of the chemically etched blade. The first side of the chemically etched blade includes one or more concave portions and one or more convex portions with at least one inflection point between the concave portions and one or more convex portions. The second side of the chemically etched blade includes one or more concave portions and one or more convex portions with at least one inflection point between the concave portions and one or more convex portions.

While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

DETAILED DESCRIPTION

Chemical etching techniques for forming cutting blades include the use of a variable permeability mask to form a beveled surface in a component, such as a metal base to create or finish a cutting edge. A cutting edge of a cutting tool may be formed from the edge of a beveled surface or the intersection of two beveled surfaces. Angles of beveled surfaces can be controlled by the configuration of the variable permeability mask as well as etching parameters such as base material, etchant solution, time and temperature. Using chemical etching techniques for forming cutting edges allows fabrication of sharp edges without mechanical processes including brittle cleavage or fracture, machining, grinding or honing. Such mechanical processes may create imprecise geometries compared to chemical etching in which etchant masks are precisely formed, e.g., using lasers. In addition, as mechanical processes often create heat, which can cause microstructural or crystallographic changes that degrade the hardness of the base material, chemical etching techniques may provide cutting edges with improved hardness compared to cutting edges formed using alternative mechanical processes.

Figure 1:
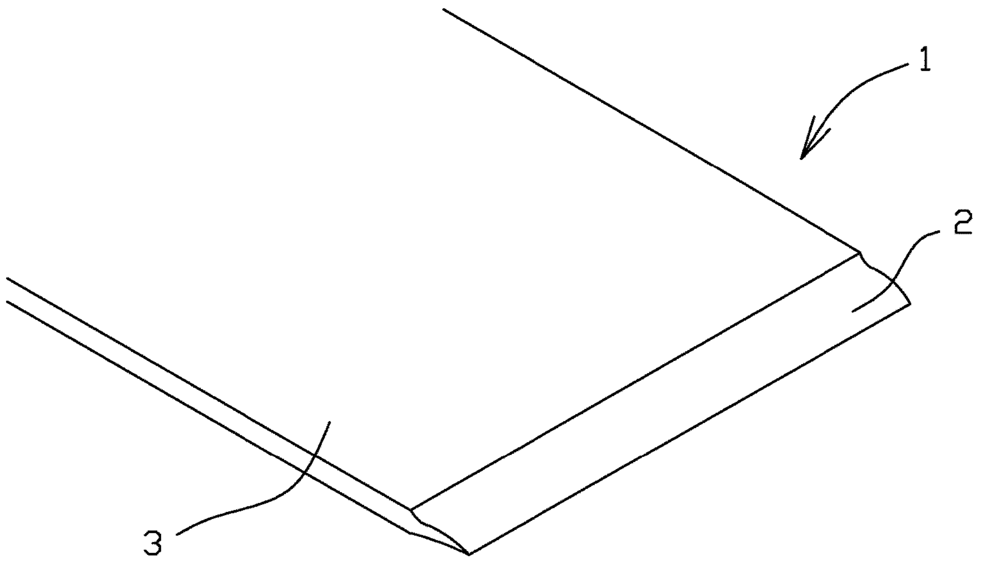
FIGS. 1-5 illustrate a cutting tool formed using chemical etching techniques according to an example of this disclosure.

FIGS. 1-5 illustrate cutting tool 1. As shown in FIG. 1, the cutting tool 1 includes a blade 2 and a main body 3. The blade 2 is the cutting surface of the cutting tool 1. The main body 3 provides structural support to the blade 2. The main body 3 forms the vast majority of the cutting tool 1 (e.g., by mass and size) while the blade 2 forms a much smaller portion of the cutting tool 1. The main body 3 may be mechanically attached to a handle and/or an automated cutting mechanism. The blade 2 is typically positioned at the end of the cutting tool 1, such as at the cutting edge of the cutting tool 1. The proximal direction, as used herein, refers to a direction toward a user handle while the distal direction, as used herein, refers to a direction (opposite the proximal direction) toward a cutting surface. The cutting tool 1 can be formed from metal, such as stainless steel, however other types of metals are possible. The cutting tool 1 can be a unitary metal body. For example, as further explained herein, a single metal sheet can be chemically etched to form the cutting tool 1 (and possibly multiple cutting tools).

Figure 2:
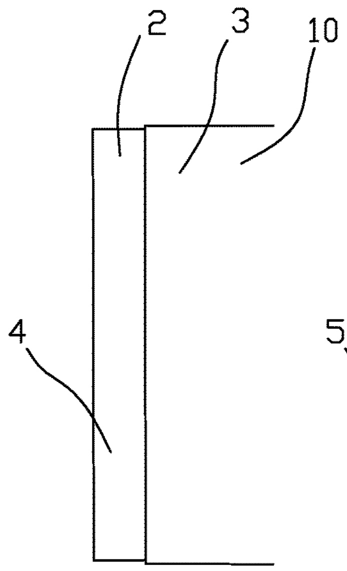
Figure 3:
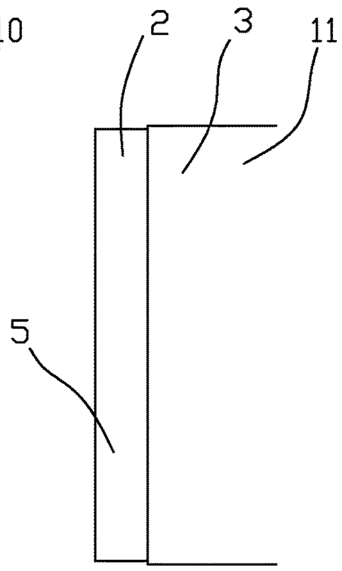

FIG. 2 shows a detailed view of the blade 2. Specifically, FIG. 2 shows a first side 10 of the main body 3 and a first side 4 of the blade 2. FIG. 3 shows another detailed view of the blade 2 but from an opposite orientation as compared to FIG. 2. Specifically, FIG. 3 shows a second side 11 of the main body 3 and a second side 5 of the blade 2. The first side 4 is opposite the second side 5. The first side 4 can be a top side of the blade 2 while the second side 5 can be a bottom side of the blade 2, although in many applications blades are not considered to have top and bottom orientations.

Figure 4:
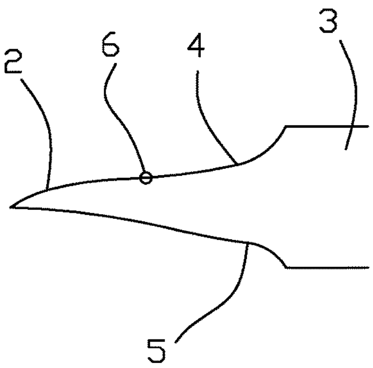

FIG. 4 shows a side view of the blade 2. As can be seen in FIG. 4, the first side 4 and the second side 5 have different profiles, and thus the sides are not identical. For example, first side 4 has a complex profile including an inflection point 6 between a distal convex portion of first side 4 and a proximal concave portion of first side 4, with the juncture of the distal convex portion and the proximal concave portion defining inflection point 6. The complex profile of first side 4 including inflection point 6 is formed from a multi-stage etching process including remasking between etching stages, e.g., as described with respect to FIGS. 8-11. In contrast, the concave profile of second side 5 may be formed with a single etching stage or from multiple etching stages without remasking between etching stages. However, depending on the geometry of the mask, is it also possible to form the concave profile of second side 5 with a multi-stage etching process including remasking between etching stages.

Figure 5:
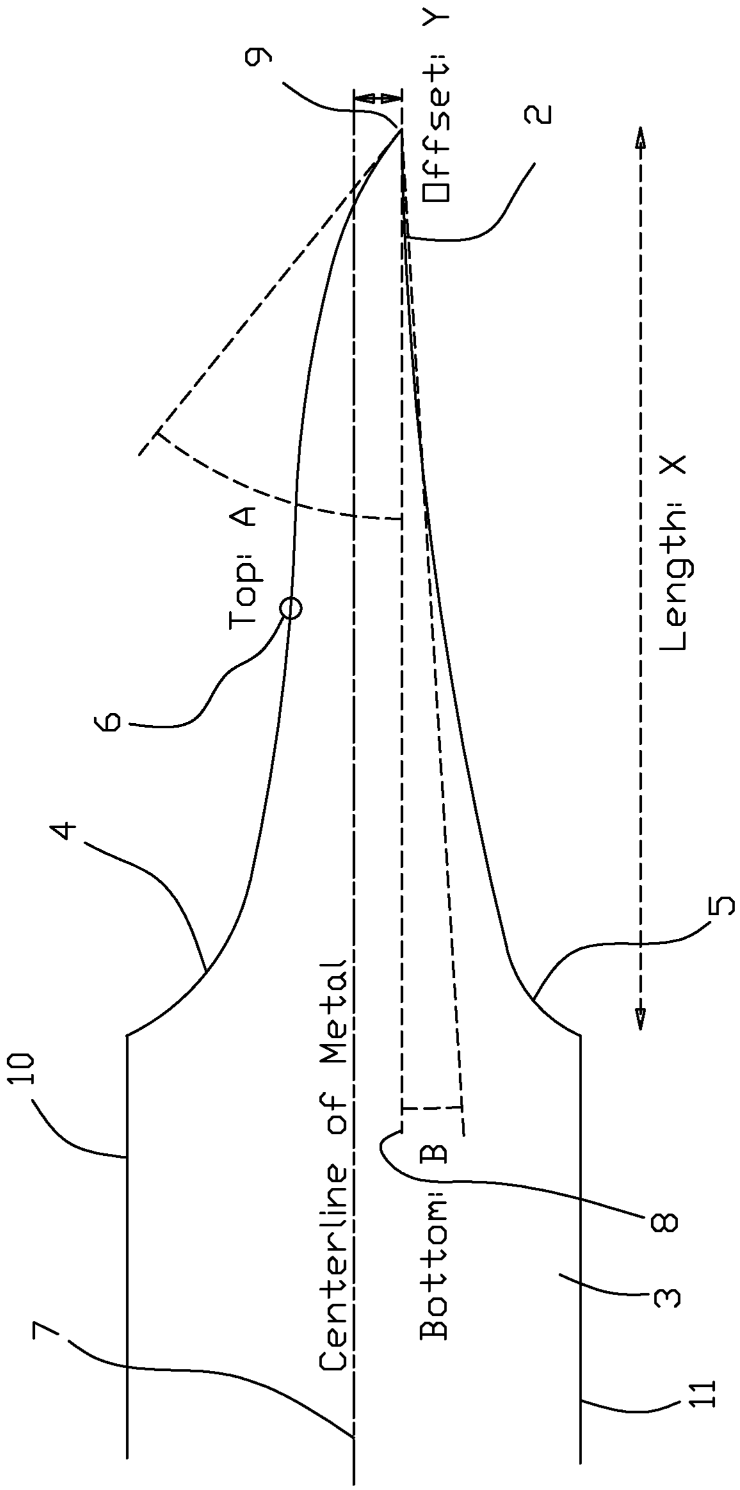

FIG. 5 shows a schematic side view of a portion of the main body 3 and the blade 2. The main body 3 includes a first side 10 and a second side 11. The first side 10 is opposite the second side 11. The first side 10 and the second side 11 can represent parallel planes. The main body 3 includes a centerline 7. The centerline 7 of the main body 3 can be parallel and equidistant from the top surface 10 and the bottom surface 11 of the main body 3.

The blade 2 includes a centerline 8. The centerline 8 of the blade 2 is aligned with the tip 9 of the blade 2. The tip 9 is the distal-most part of the blade 2 and represents the cutting edge of the blade at the cross-section shown in FIG. 5. The centerline 8 of the blade 2 can extend parallel with the profile of the main body 3, such as by being parallel with the first side 10 and the second side 11 of the main body 3.

As shown in FIG. 5, as also in FIG. 4, the first side 4 and the second side 5 have different profiles. The different profiles result in an offset between the centerline 7 of the main body 3 and the centerline 8 of the blade 2. For example, the first side 4 has a more gradual slope while the second side 5 has a steeper slope proximally and a flatter profile distally. In the side view of FIG. 5, the blade 2 can be characterized by a first angle A and a second angle B. The first angle A can be measured, looking proximally from the tip 9, as the angle between the centerline 7 of the main body 3 and the centerline 8 of the blade 2. In some examples, the first angle A can be between 27° and 32°, although angular values outside of this range, such as larger and smaller angles, are also within the scope of this disclosure. In some examples, the second angle B can be less than 5°, however larger values for second angle B are within the scope of this disclosure. In some specific examples, a tip angle, the sum of the first angle A and the second angle B may be between about 20 degrees and about 35 degrees. The blade includes a length X. The length X is measured from the distal terminus of the main body 3 (at the point where the cutting tool 1 transitions between the planar profile of the main body 3 and the slope profile of the blade 2) to the tip 9. The length X can be 400 μm, however it will be understood that other lengths, smaller and larger, are within the scope of this disclosure. Fabrication of the example of FIGS. 1-5 and other examples are further discussed herein.

Figure 6:
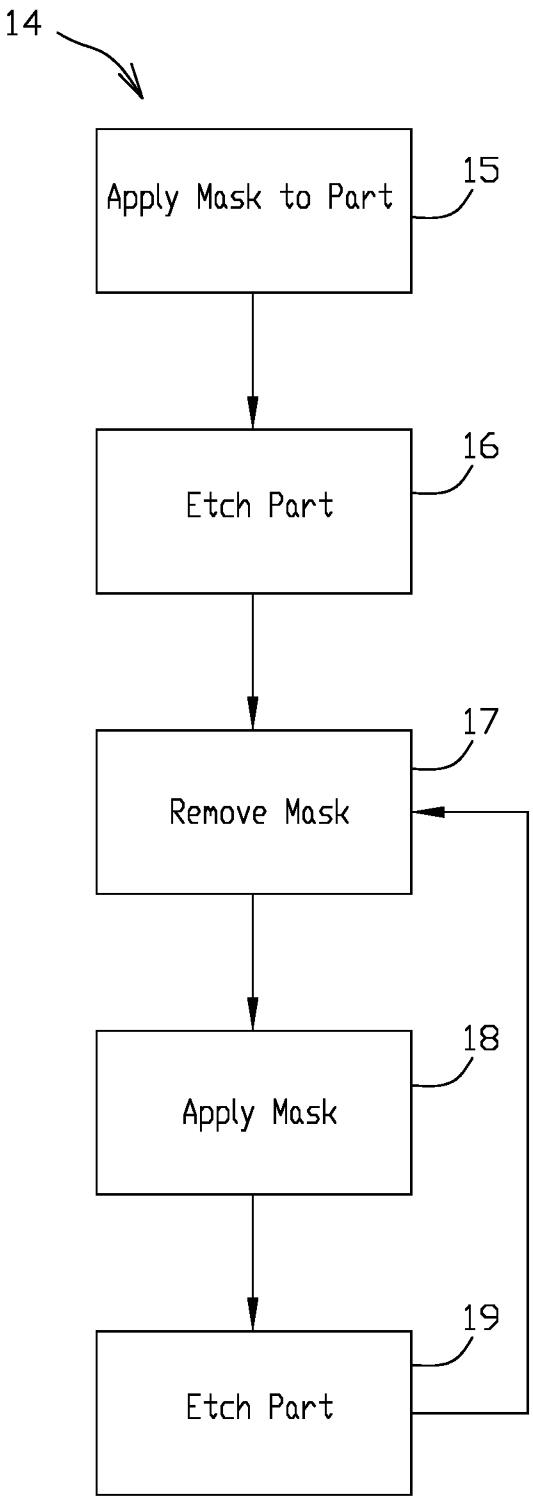
FIG. 6 is a flowchart illustrating chemical etching techniques for forming a blade.

FIG. 6 illustrates a method 14 for fabricating a blade of a cutting tool. The method 14 can be used to fabricate the blade 2 of FIGS. 1-5; however the blade 2 can be formed by other methods. Likewise, the method 14 can be used to fabricate other blades having different profiles. The method 14 presumes the provision of a metal base, such as a sheet of metal. The metal can be stainless steel, for example. In different examples, the thickness of the metal base may be less than about 1000 micrometers, such as less than about 500 micrometers, such as between about 250 micrometers and about 500 micrometers. However, in other examples, metal bases with thicknesses larger than 1000 micrometers or smaller than 250 micrometers may be used. In addition, a metal base may include beveling, such that etching is used to finish a blade edge rather than form a blade edge from metal base two generally parallel major surfaces. In such examples, metal bases many times thicker than 1000 micrometers are practical.

The method 14 includes applying 15 one or more masks to the metal base. The masks can be applied in various different ways. One type of mask can be applied as a dry film photoresist, in which an undeveloped film is placed on the metal base and then developed by light. The light can be a laser light which is directed only on those portions of the film corresponding to the sections of the metal base which are not to be etched. Alternatively, the light can be broad-band light, such as broadband ultraviolet light. With use of a negative tone photoresist the broadband light is shown only on those sections of the film overlapping sections of the metal base which are not to be etched, the light for those sections to be etched blocked by a screen having a profile similar to the planned area of etching. Whether by laser, ultraviolet light, or other means, the film is hardened into a mask over those areas of the metal base which are not to be etched while other areas of the film are left unhardened. The hardening adheres the film to the metal base. Unhardened areas are then washed away, leaving a mask which protects particular areas of the metal base which are not to be etched while leaving exposed other areas of the metal base which are to be etched. Positive tone photoresist may be used as an alternative to negative tone photoresist.

The method 14 further includes etching 16. An etchant solution can be used to perform etching 16. An aqueous solution of ferric chloride can be used, for example, however other etching chemicals are possible. The etchant solution removes metal portions of the metal base from the exposed areas. The etchant solution typically does not react with the material of the mask and as such the etchant solution typically does not penetrate directly through the mask to remove metal directly underneath the mask, particularly when a solid mask is used with no discontinuities. The etchant solution can remove metal in a rapid manner by a chemical process similar to corrosion. The etchant solution can be sprayed on the metal base and/or the metal base can be dipped in etchant solution, amongst other options.

The method 14 further includes removal 17 of one, several or, all of the one or more masks previously applied 15. One or more masks can be scraped away and/or chemically removed such as with a solvent (e.g., an organic solvent in the case of a polymer-based mask).

The method 14 further includes applying 18 one or more masks. The process can be similar to that of the previous application 15 of one or more masks. In some cases, a mask is applied 18 to a surface of the metal base that was previously etched 16. It is noted that the scope of the present disclosure is not limited to the masking techniques referenced herein, as one having ordinary skill in the art will know that various other masking techniques can be applied to the techniques of the present disclosure.

The method further includes etching 19 the metal base. The etching 19 can be similar to the previous etching 16 step. As shown, the method 14 can loop back to removal 17 of the mask that was applied 18 in the same loop. The steps of mask removal 17, mask application 18, and etching 19 can be repeated on the metal base to selectively remove portions of the metal base while protecting other portions from etching 19. This loop can be repeated one, two, three or more times as necessary to form a blade having a preferred profile.

Blade fabrication from a metal base, according to the present methods, can be accomplished by etching alone. Blade fabrication according to the present methods can be accomplished without any mechanical machining of the blade. However, other portions of the cutting tool may be mechanically machined.

One advantage of chemically sharpened blades, as compared to mechanically machined blades, is that the chemically sharpened blades can be in an optimally hardened state before etching and the etching will not change the hardened state of the metal (e.g., will not soften or otherwise change the grain structure of the metal). Mechanically machined blades typically soften during mechanical machining due to the heat generated by the mechanical machining. Mechanically machined blades must be rehardened after mechanical machining. Thus chemically sharpened blades may be hardened only once.

Some variations of the method 14 includes only application 15 of the mask, etching 16, and mask removal 17, and thus do not include subsequent mask application 18 and etching 19. In other words, some blades according to the present disclosure are formed by a single etching step. Two etching 16, 19 steps are shown because many techniques according to the present disclosure include multiple etching steps with selectively removing different metal base portions.

The method 14, or a variation thereof, can be used to form any blade of the present disclosure. The subsequent FIGS. show specific applications of the method 14 and variations thereof. As such, the techniques of the method 14 can be applied to any example referenced herein while specific aspects and variations of these examples discussed herein can likewise be applied to the method 14.

Figure 7:
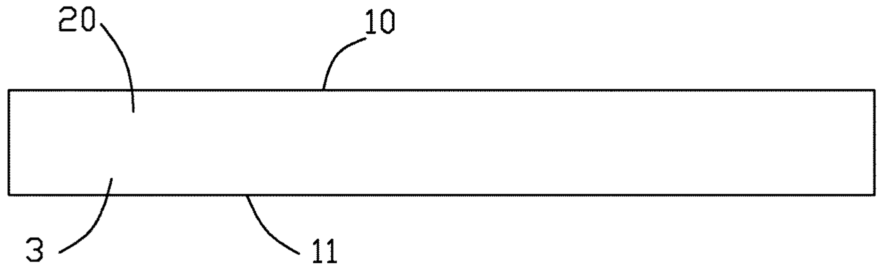
FIGS. 7-11 illustrate stages of fabrication of a blade of the cutting tool of FIGS. 1-5 according to an example of this disclosure.

FIGS. 7-11 show stages of fabrication of the blade 2. FIG. 7 shows a side view of a metal base 20. The metal base 20 can be a sheet of stainless steel or other metal. The metal base 20 can be a thin, planar portion of metal. It is noted that the proximal direction is leftward while the distal direction is rightward in the remainder of the FIGS.

Figure 8:
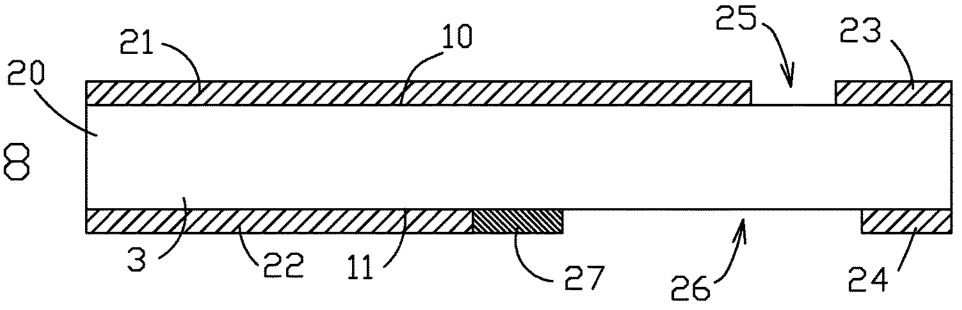

FIG. 8 shows a side view of the metal base 20 after application of a plurality of masks. The process of masking can correspond to the masking 15 step of the method 14 or any other masking procedure referenced herein. Specifically, a first mask 21 was applied to the first side 10 of the main body 3, a second mask 22 was applied to the second side 11 of the main body 3, the third mask 23 was applied coplanar with the first mask 21, and a fourth mask 24 was applied coplanar with the second mask 22. A first variable permeability mask 27 was applied coplanar with the second mask 22. A proximal end of the first variable permeability mask 27 can be continuous with a distal end of the second mask 22 such that they are part of the same layer. Alternatively the first variable permeability mask 27 and the second mask 22 can be formed by different layers of masking material.

The first mask 21 and the third mask 23 can be part of the same layer of masking material, or can be different layers entirely. Likewise, the second mask 22 and the fourth mask 24 can be part of the same layer of masking material or can be different layers entirely. Each of the first mask 21, the second mask 22, the third mask 23, and the fourth mask 24 can be regarded as a solid mask which does not comprise any voids within the respective mask and which is not permeable to etchant solution. A first window 25 is formed between the first mask 21 and the third mask 23. A section of the metal base 20 is exposed through the first window 25. A second window 26 is formed between the second mask 22 and the fourth mask 24. A section of the metal base 20 is exposed through the second window 26.

Variable permeability masks, such as first variable permeability mask 27, have profiles that vary in permeability to etchant solution along the proximal-distal axis. In contrast to solid masks, such as the first, second, third, and fourth masks 21-24, which are not permeable to etchant solution, a variable permeability mask is semipermeable to etchant solution and has increasing permeability distally along the variable permeability mask. More specifically, a variable permeability mask is less permeable proximally and more permeable distally. A variable permeability mask may change in permeability linearly along the length of the mask, from a proximal end to a distal end of the mask. Such variable permeability masks can slow the removal of metal material of a metal base underneath the variable permeability mask relative to unmasked portions of the metal base while still permitting some removal of metal material. As such, in a single etching step, large amounts of metal material can be removed from unmasked portions of the metal base, a lesser amount of metal material can be removed from another portion of the metal base masked with a variable permeability mask, and no metal can be removed from underneath solid masks.

By use of a variable permeability mask, metal portions of a metal base can be selectively removed in different quantities by removing the metal at different rates to achieve a preferred blade profile by use of various different types of masks, which may include use of a variable permeability mask. The combined use of solid masks, variable permeability masks, and/or unmasked sections of metal can selectively control etching, such as the rate of etching, to shape the metal base 20 into a blade 2 having a preferred profile (e.g., balancing sharpness and thickness/durability). Variable permeability masks, such as first variable permeability mask 27, are further discussed in connection with FIGS. 12 and 13.

The example shown in FIG. 8 can be exposed to etchant solution. Such etching can correspond to the etching 16 step of the method 14. The first window 25 and the second window 26 expose respective portions of the metal base 20 to the etchant solution while the first variable permeability mask 27 partially protects a portion of the metal base 20 underlying the first variable permeability mask 27 which serves to expose the portion of the metal base 20 to the etchant solution but in a limited manner to slow the rate of material removal.

Figure 9:
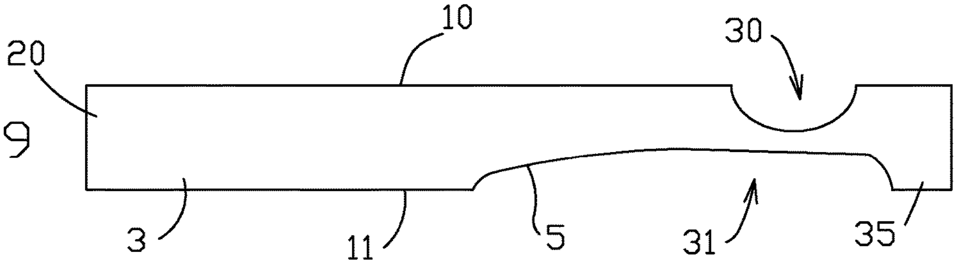

FIG. 9 shows a side view of the metal base 20 after exposure to etchant solution and mask removal (e.g., corresponding to the etching 16 and mask removal 17 steps of the method 14). As shown in FIG. 9, a first void 30 has been formed on the first side 10 of the metal base 20. The first void 30 results from etching material passing through the first window 25 of the example of FIG. 8, and forms a concave surface. As further shown in FIG. 9, a second void 31 on the second side 11 of the metal base 20 forms another concave surface. The second void 31 results from etching material passing through the window 26 of the example of FIG. 8. It is noted that the first void 30 has a profile that is distally and proximally symmetrical while the second void 31 has a profile that is not distally and proximally symmetrical. Specifically the proximal side of the second void 31 has a shallower slope than the distal side of the second void 31. The shallower slope of the proximal side of the second void 31 is due to the first variable permeability mask 27 slowing the removal of metal material during the etchant solution exposure. This slowed removal of metal material forms the second side 5 of the blade 2, whereas faster exposure would have formed a more abrupt transition resulting in a thinner blade 2.

The first void 30 is formed to begin removal of a residual end 35 of the metal base 20. The first void 30 and the second void 31 can be trenches that extend laterally (e.g., orthogonal to the proximal-distal axis). The removal of the entirety of the residual end 35 is desired, however it is preferred not to remove the residual end 35 in a single step as this would require a prolonged exposure to etchant material which would jeopardize the formation of the preferred profile of the blade 2. As such, the blade 2 can be formed using masking, etching, and re-masking and re-etching steps.

Figure 10:
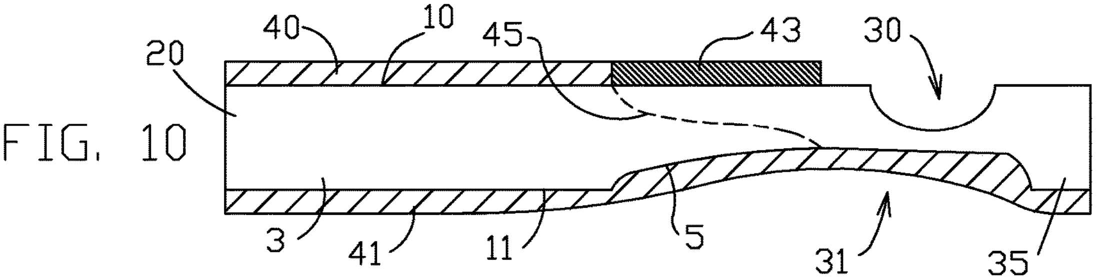

FIG. 10 shows a side view of the metal base 20 after the application of a plurality of masks. Such re-masking can correspond to the mask application 18 step of the method 14. A fifth mask 40 is applied to the first side of the metal base 20. A sixth mask 41 is applied to the second side 11 of the metal base 20. A second variable permeability mask 43 is applied to the first side 10 of the metal base 20. The second variable permeability mask 43 can be separate from, or continuous with, the fifth mask 40. The second variable permeability mask 43 can be coplanar with the fifth mask 40. The second variable permeability mask 43 can have a similar configuration to the first variable permeability mask 27. The sixth mask 41 covers the entirety of the second side 11. The sixth mask 41 extends within, and insulates, the metal of the metal base 20 defining the second void 31. Due to the first void 30, a subsequent etching step does not have to move much metal directly below the first void 32 to remove the residual end 35 from the rest of the metal base 20.

Removal line 45 is underneath the second variable permeability mask 43. As discussed herein, a variable permeability mask can slow the etching process to form a preferred blade profile. As such, subsequent exposure to etchant solution will remove portions of the metal base 20 down to the removal line 45 while removing metal more rapidly from unmasked portions of the metal base 20. The application of second variable permeability mask 43 and etching of first void 30 creates a complex profile for first side 4 including inflection point 6 defined by the juncture of a distal convex portion of first side 4 and a more proximal concave portion of first side 4.

Figure 11:
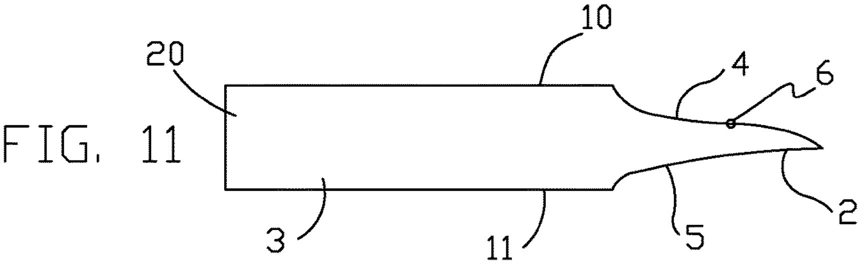

FIG. 11 shows a side view of the metal base 20 after exposure to etchant solution (e.g., corresponding to the etching 19 step of the method 14) and mask removal. As shown, removal of all metal down to the removal line 45 forms the first side 4 of the blade 2. As shown in FIGS. 7-11, the second side 5 of the blade 2 is formed into its final state through one etching step and then masked to protect the second side 5 while the first side 4 of the blade 2 is still being formed in at least one more further etching step.

Figure 12:
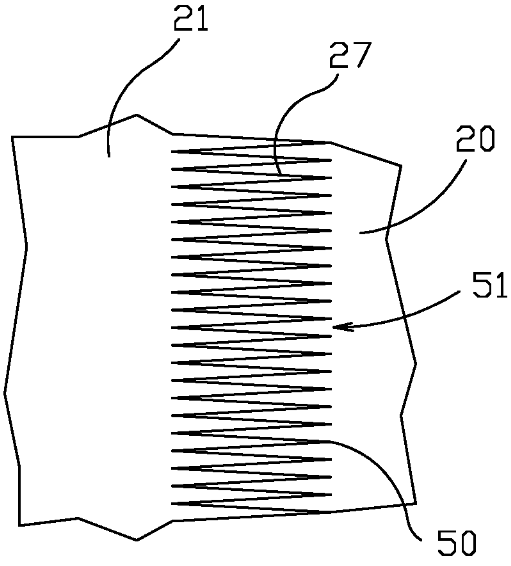
FIGS. 12 and 13 illustrate a variable permeability mask in combination with a non-permeable mask according to an example of this disclosure.
Figure 13:
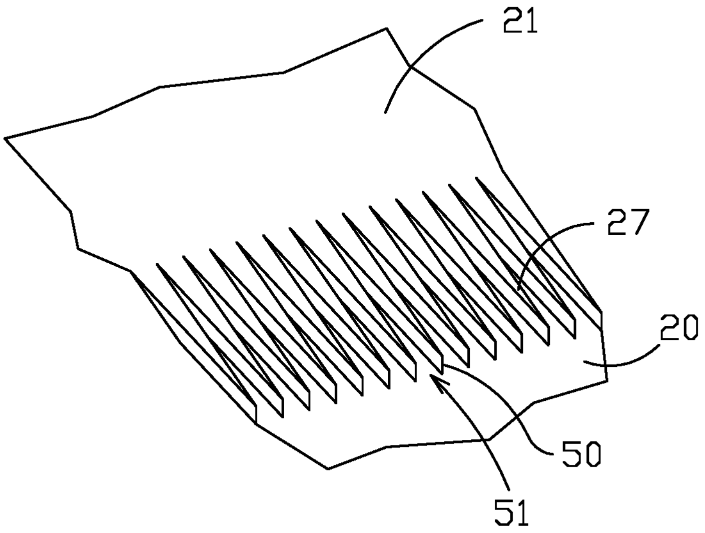

FIG. 12 shows an overhead view of the first mask 21 and first variable permeability mask 27 on the metal base 20 before etching. FIG. 13 shows a schematic view of the first mask 21 and the first variable permeability mask 27 on the metal base 20. As shown in these FIGS., the first mask 21 is continuous with the first variable permeability mask 27. Also, the first mask 21 is solid while the first variable permeability mask 27 includes an array of projections 50 interspaced with an array of gaps 51. The array of projections 50 are separated by the array of gaps 51, forming a comb pattern. Each of projections 50 are shown as tapering in the distal direction while the gaps narrow, in a complementary manner, in the proximal direction. The profile creates variable permeability such that the permeability of the mask increases distally. This results in a variable etch rate. This variable etch rate is controlled by restricting the exchange rate of the etchant to the surface of the metal base 20, thus reducing the amount of etching. Etchant fluid exchange becomes limited as width of developed image opening becomes smaller than thickness of photoresist. This reduced fluid exchange rate can be accomplished by using high aspect ratio (depth to width) of photoresist openings (i.e. gaps 51). As the aspect ratio of a resist opening grows greater than 1 (more deep than wide), at the etchant viscosity, the etchant fluid exchange begins to be reduced. This profile of the first variable permeability mask 27 permits more etching distally while providing more insulation, and greater inhibition of etching, proximally. It is noted that the length of the projections 50 and the size of the gaps 51 is proportional to the resulting blade slope. The tips of the projections can have a center-to-center spacing of 150 μm, however larger or smaller spacing is also possible. Each gap 51 may be 20 μm proximally and 40 μm distally. The other variable permeability masks referenced herein can have a similar configuration as that of the first mask 21. Being that the blade 2 tapers in the distal direction, each variable permeability mask referred to herein may be placed such that the projections 50 are widest proximally and narrowest distally while the gaps between the projections are narrowest proximally and widest distally.

The first variable permeability mask 27 has a "V" shaped comb shape. At the end of the projections 50, where a high fluid exchange is allowed, the pitch between these "V" tips may be kept at or below the thickness of the first variable permeability mask 27. This is an aspect ratio near 1. As the photoresist opening gets narrower proximally, the aspect ratio grows to near 3. This means that the developed image cleared is near 13 μm in a 40 μm thick variable permeability mask. The length of the projections 50 determine the slope of the blade 2. A preferred slope may be approximately 30-40 degrees.

Figure 40:
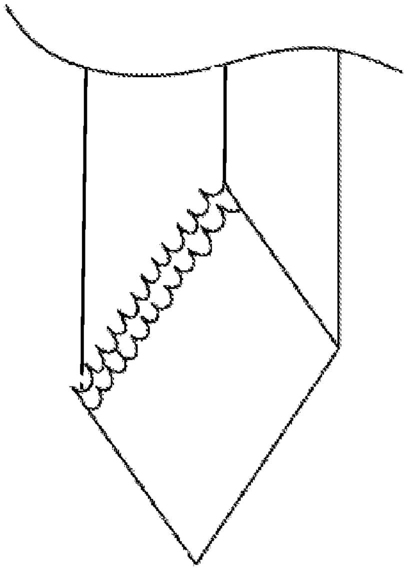
FIG. 40 illustrates the shape of a blade edge including serrations according to an example of this disclosure.

The shape of a blade edge as represented by the cross-sections shown in herein may be straight, curved or more complex geometry. For example, the shape of a blade edge may include serrations, such as those illustrated in FIG. 40. The blade shape would be defined according to the shape of the masking used to form the blade edge as well as other etching parameters such as base material, etchant solution, time and temperature. Features such as serrations would be significantly larger than the center-to-center spacing of projections of a variable permeability mask. For example, the distance between adjacent serrations of a cutting edge may be at least three times larger than the center-to-center spacing of projections of a variable permeability mask.

Figure 14:
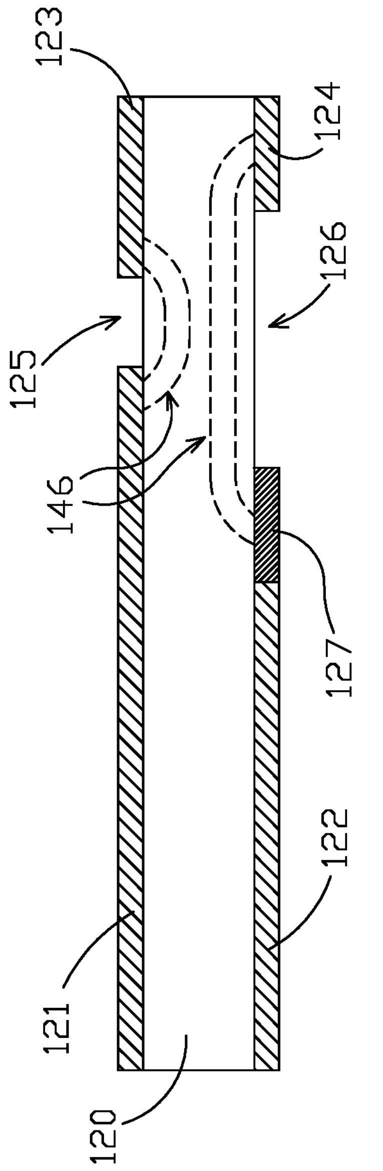
FIGS. 14 and 15 illustrate stages of fabrication of a blade of a cutting tool according to an example of this disclosure.
Figure 15:
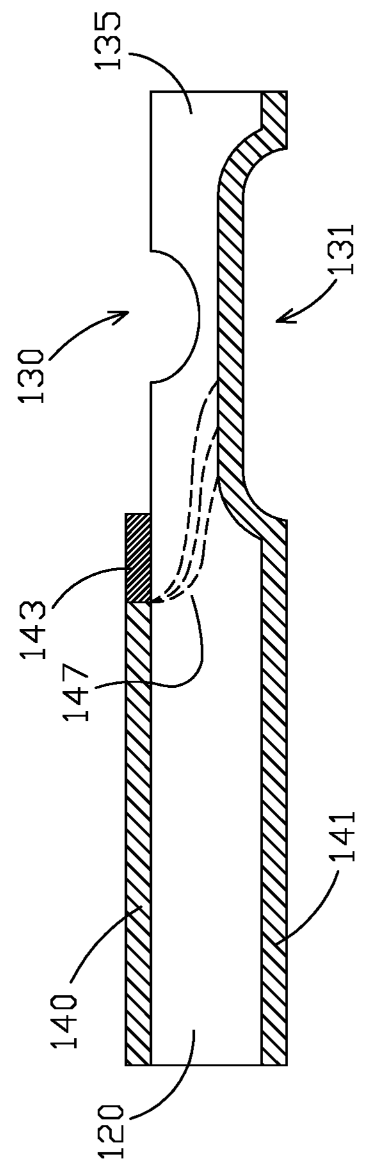

FIGS. 14 and 15 show a two-step etching process for the formation of a blade from a metal base 120. It is noted that reference numbers used herein for different examples may be serialized (e.g., XX, 1XX, 2XX, etc.) from other examples when referring to similar parts, the parts having similar properties unless otherwise noted. For example, the metal base 120 may be similar to metal base 20 and first mask 21 may be similar to first mask 21, etc. Likewise, parts sharing similar names may have similar properties unless otherwise noted. Thus, each example provided herein is presented as a non-limiting example and one having ordinary skill in the art will understand that aspects of the various examples can be combined while remaining within the scope of the present disclosure.

In the example of FIG. 14, a first mask 121, a second mask 122, a third mask 123, and a fourth mask 124 are applied to the metal base 120. A first variable permeability mask 127 is applied in contact with and optionally continuous with, the second mask 122. First window 125 is formed between the first mask 121 and the third mask 123. The second window 126 is formed between the first variable permeability mask 127 and the fourth mask 124. Etching may occur through the first window 125 and the second window 126 along removal lines 146. Multiple removal lines 146 are shown overlaid each other to represent the progression of removal of metal of the metal base 120 such that a shape corresponding to any removal line can be achieved depending on duration of etchant solution exposure.

Etching solution is applied to the example of FIG. 14 in a first stage. FIG. 15 represents an example following the first stage and re-masking. The state of the example of FIG. 15 precedes a second application of etchant solution in a second stage. Following the first stage, a third mask 123 and a sixth mask 141 are applied to the metal base 120. The sixth mask 141 is shown to cover the entirety of the second void 131. The first void 130 comprises a trench which will isolate the residual end 135 for removal in the second etching stage. A second variable permeability mask 143 is applied in contact with or continuous with the fifth mask 140. Removal lines 147 show the progression of metal removal and the blade profiles that can result depending on when the etchant solution exposure is stopped. As shown, the metal removal more rapidly (and thus deeper within the metal base 120) distally of the second variable permeability mask 143 and slower (and thus shallower within the metal base 120) underneath the second variable permeability mask 143. As represented by removal lines 147, the etching of first void 130 following the application of variable permeability mask 143 creates a blade surface with a complex profile including an inflection point defined by the juncture of a distal convex portion and a more proximal concave portion.

Examples of FIGS. 14 and 15 have relative dimensional relationships between various portions as indicated. Such relative dimensional relationships can be applied to other examples disclosed herein, and are not limited to the example of FIGS. 14 and 15.

Figure 16:
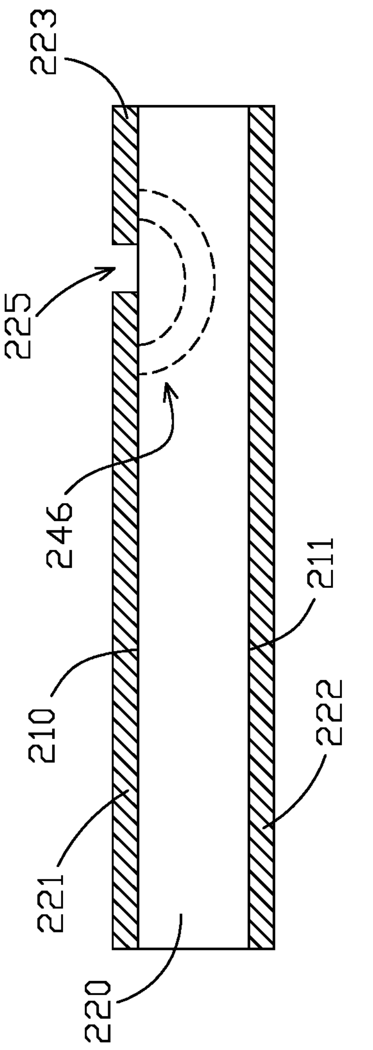
FIGS. 16 and 17 illustrate stages of fabrication of a blade of a cutting tool according to an example of this disclosure.
Figure 17:
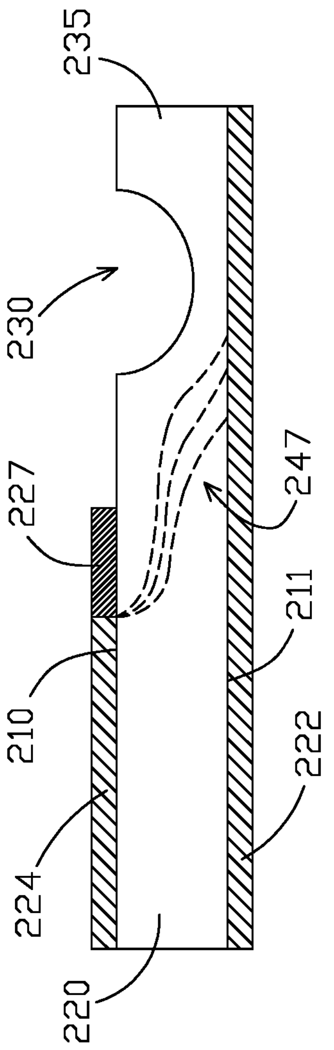

FIGS. 16 and 17 are side views of a two-stage etching process for the formation of a blade. It is noted that the two-stage etching process according to FIGS. 16 and 17 forms a single bevel blade, whereas previous blades discussed herein are double bevel blades (e.g., two bevels on opposite sides of the blade). The two-stage etching process begins by masking a metal base 200. The masking includes application of a first mask 221 to a first side 210, a second mask 222 to a second side 211, and a third mask 223 to the first side 210. The first window 225 is formed between the first mask 221 and the third mask 223. The first window 225 exposes a portion of the metal base 200 for etching. Removal lines 246 show the progression of removal of the metal of the metal base 200 over time.

FIG. 17 shows a state of the metal base 200 after the first etching step has been performed to form first void 230 and metal base 200 has been re-masked. Following the first etching process, the first mask 221 can be fully or partially removed (e.g., such that the proximal portion is left in place), the second mask 222 can be removed or left in place, and/or the third mask 223 can be removed.

The re-masking of the metal base 202 can include the application of fourth mask 224. The re-masking also includes the application of a first variable permeability mask 227 to the first side 210. The first variable permeability mask 227 overlies the removal lines 247 showing the progression of metal removal and etching process. As shown from the removal lines 247, the depth of metal removal is more rapid distally of the first variable permeability mask 227 and slower underneath the first variable permeability mask 227. This is because more etching has to be done near the blade tip to form a sharp cutting surface while the blade must be thicker proximally to form a robust and durable blade. Because the etchant solution would otherwise remove the metal at equal rates along the first side 210 and thus not allow for an appropriately sloped profile, the first variable permeability mask 227 is used to slow the rate of metal removal at a selected portion of the metal base 200. Depending on the desired shape of the blade, removal lines 247 show the different blade profiles that can be formed depending on the duration of etchant solution exposure. As represented by removal lines 247, the etching of first void 230 following the application of variable permeability mask 227 creates a blade surface with a complex profile including an inflection point defined by the juncture of a distal convex portion and a more proximal concave portion. At intermediate etching stages represented by removal lines 247, the etching of first void 230 following the application of variable permeability mask 227 may create a blade surface with a complex profile including two inflection points defined by the junctures of a distal concave portion, an intermediate convex portion and a more proximal concave portion. Through further etching the distal concave portion may be removed to leave a complex profile including a single inflection point defined by the juncture of a distal convex portion and a more proximal concave portion, e.g., as discussed with respect to FIG. 4.

It is noted that the two-stage etching of FIGS. 16 and 17 are formed on only one side of the metal base 200 while the other side of the metal base 200 is insulated by the second mask 222. Thus, one side of the resulting blade (corresponding to the second side 211) will be straight, without a bevel, all the way to the tip of the blade, while the other side of the blade (corresponding to the first side 210) will have a bevel.

It is noted while a two-stage etching process is shown in FIGS. 16 and 17, a single stage etching process or a three stage etching process (or even further cycles of etching) can be performed instead.

Figure 18:
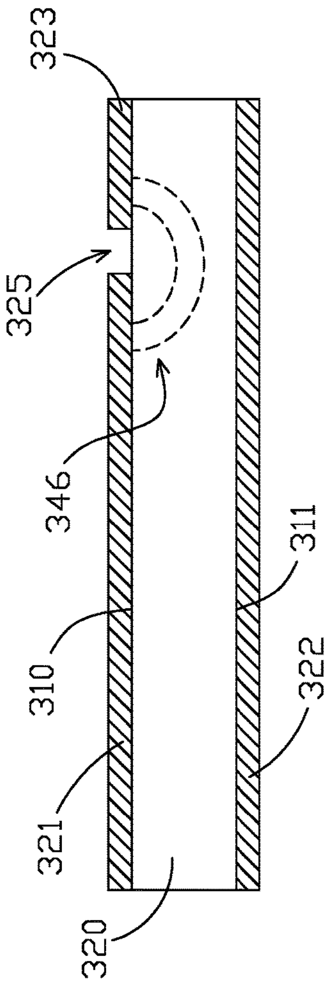
FIGS. 18-20 illustrate stages of fabrication of a blade of a cutting tool according to an example of this disclosure.
Figure 19:
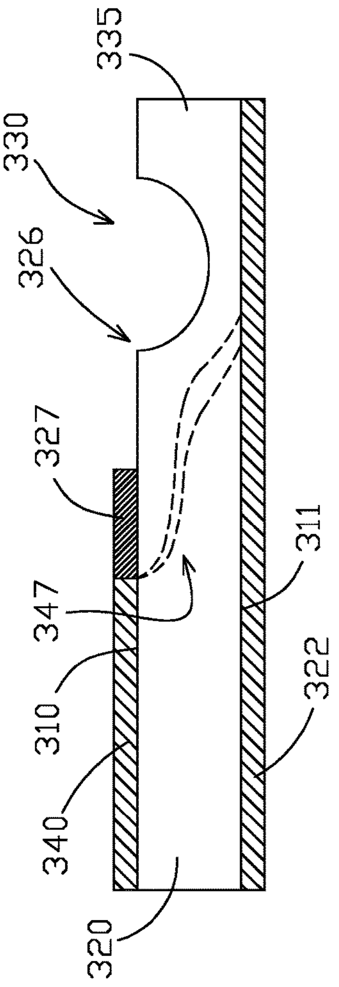
Figure 20:
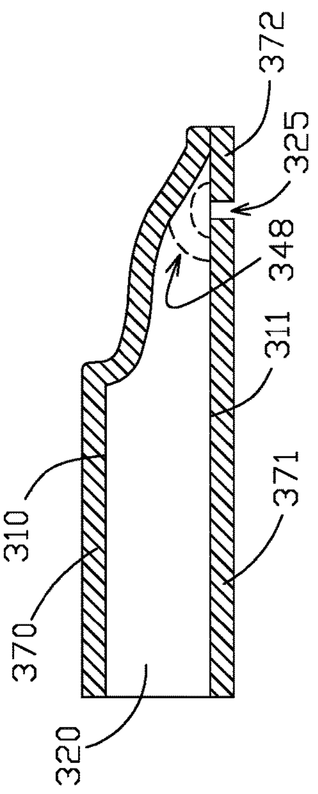

FIGS. 18-20 show a side view of a three stage etching process for the formation of a blade. As shown in FIG. 18, the method starts with a metal base 320 being masked. The masking includes the application of a first mask 321 to a first side 310 of the metal base 320, the application of a second mask 322 to a second side 311 of the metal base 320, and application of the third mask 323 to the first side 310 of the metal base 320 distally of the first mask 321. A window 325 is formed between the first mask 321 and the third mask 323. Removal lines 346 show the progression of etching that will occur through the first window 325. After masking, the metal base 320 is exposed to etchant solution.

FIG. 19 shows the metal base 320 after the exposure to etchant solution and after being re-masked. The etching formed voids 330, which can be a trench extending along the metal base 320 to isolate the residual end 335 for removal in a second etching stage. Relative to the example of FIG. 18, a fourth mask 340 is applied partially in place of the first mask 321. Distally of the fourth mask 340, a first variable permeability mask 327 is applied to the first side 310. The second mask 322 can remain in place from the first etching stage or can be replaced. Removal lines 347 show the progression of metal removal over time. The example of FIG. 19 is exposed to etchant solution in a second etching stage. As represented by removal lines 347, the etching of void 330 following the application of variable permeability mask 327 creates a blade surface with a complex profile including two inflection points defined by the junctures of a distal concave portion, an intermediate convex portion and a more proximal concave portion. Through further etching, as shown in FIG. 20, the distal concave portion may be removed to leave a complex profile including a single inflection point defined by the juncture of a distal convex portion and a more proximal concave portion.

FIG. 20 shows the metal base 320 after exposure to etchant solution in a second etching stage and after being re-masked. Following the etching of the second stage, the fourth mask 340 can be removed and a fifth mask 370 can be added to the first side 310 of the metal base 320. A sixth mask 371 can be applied to the second side 311 of the metal base 320. The sixth mask 371 can be a new mask or can be a cut down version of the second mask 322. A seventh mask 372 is added to the second side 311 of the metal base 320 distally of the sixth mask 371. A second window 325 is formed between the sixth mask 371 in the seventh mask 372 to expose a portion of the metal base 320 etching in a third stage. The seventh mask 372 can be separate from the fifth mask 370 or can be a portion of the fifth mask 370 that wraps around the distal end of the metal base 320. Removal lines 348 show the progression of metal removal through the second window 325 and the final formation of the blade. Removal lines 348 represent a concave blade surface resulting from the single masking and etching stage.

Figure 21:
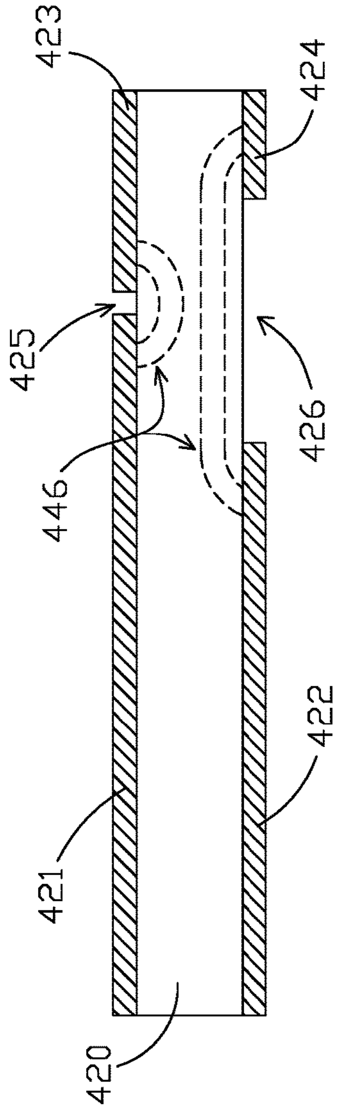
FIGS. 21-23 illustrate stages of fabrication of a blade of a cutting tool according to an example of this disclosure.
Figure 22:
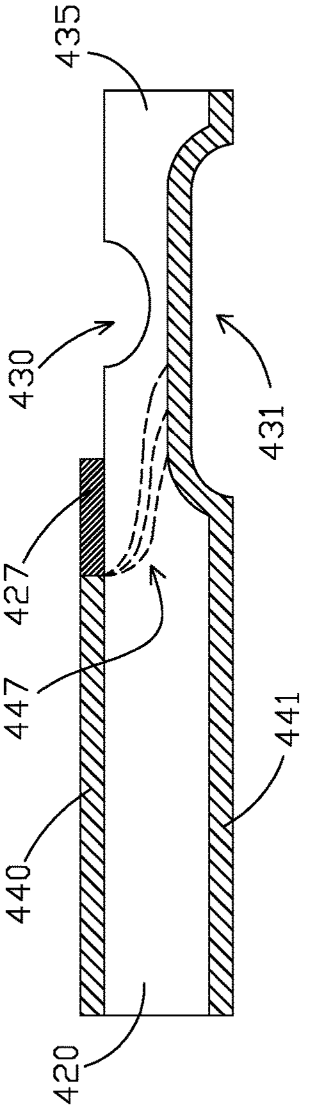
Figure 23:
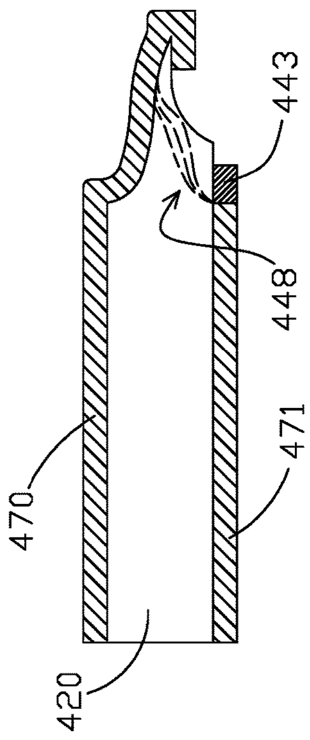

FIGS. 21 to 23 show side views of a three stage etching process for the formation of a blade. A first stage is shown in FIG. 21 in which metal base 20 has a first mask 421, a second mask 422, a third mask 423, and a fourth mask 424 applied thereon. The masks are applied to form first window 425 and second window 426. Removal lines 446 are provided to indicate the progression of material removal through the first window 425 and the second window 426.

The example of FIG. 22 shows the state of the metal base 420 following etchant solution exposure in the first stage and mask removal and re-masking. A fifth mask 440 is applied in contact with or continuous with a first variable permeability mask 427. A sixth mask 441 is applied to entirely insulate the metal of the metal base 420 that defines the second void 431. Removal lines 147 are shown below the first variable permeability mask 427, illustrating how the shape of the blade can be selected based on the duration of etchant solution exposure. A first void 430 is formed through the first window 425 to facilitate the removal of the residual end 435 without prolonged etchant solution exposure. The example of FIG. 22 is exposed to etchant solution in a second phase. As represented by removal lines 447, the etching of void 430 following the application of variable permeability mask 427 creates a blade surface with a complex profile including an inflection point defined by the juncture of a distal concave portion and a more proximal convex portion.

FIG. 23 shows the re-masking of the metal base 420 following the second phase, in preparation for a third phase of etching. A seventh mask 470 and an eighth mask 471 are applied to the metal base 420. A third variable permeability mask 443 is also applied. Removal lines 448 show the various profiles that can be achieved based on the timing of the total duration of etchant solution exposure in a third stage. In some specific examples, the tip angle of the finished blade may be between about 20 degrees and about 35 degrees. As represented by removal lines 448, the etching of void 431 following the application of variable permeability mask 443 creates a blade surface with a complex profile including two inflection points defined by the junctures of a distal concave portion, an intermediate convex portion and a more proximal concave portion. Through further etching the distal concave portion may be removed to leave a complex profile including a single inflection point defined by the juncture of a distal convex portion and a more proximal concave portion.

FIGS. 24-27 show side views of a four stage etching process for the formation of the blade. The process includes applying a first mask 521 to a first side 510 of the metal base 520, applying a second mask 522 to a second side 511 of the metal base 520 and applying a third mask 523 to the first side 510 of the metal base 520. The first mask 521 and the third mask 523 are separated along the first side 510 to form window 526. Removal lines 546 show the progression of material removal from etchant solution through the window 526.

Figures 24, 25, 26, 27:
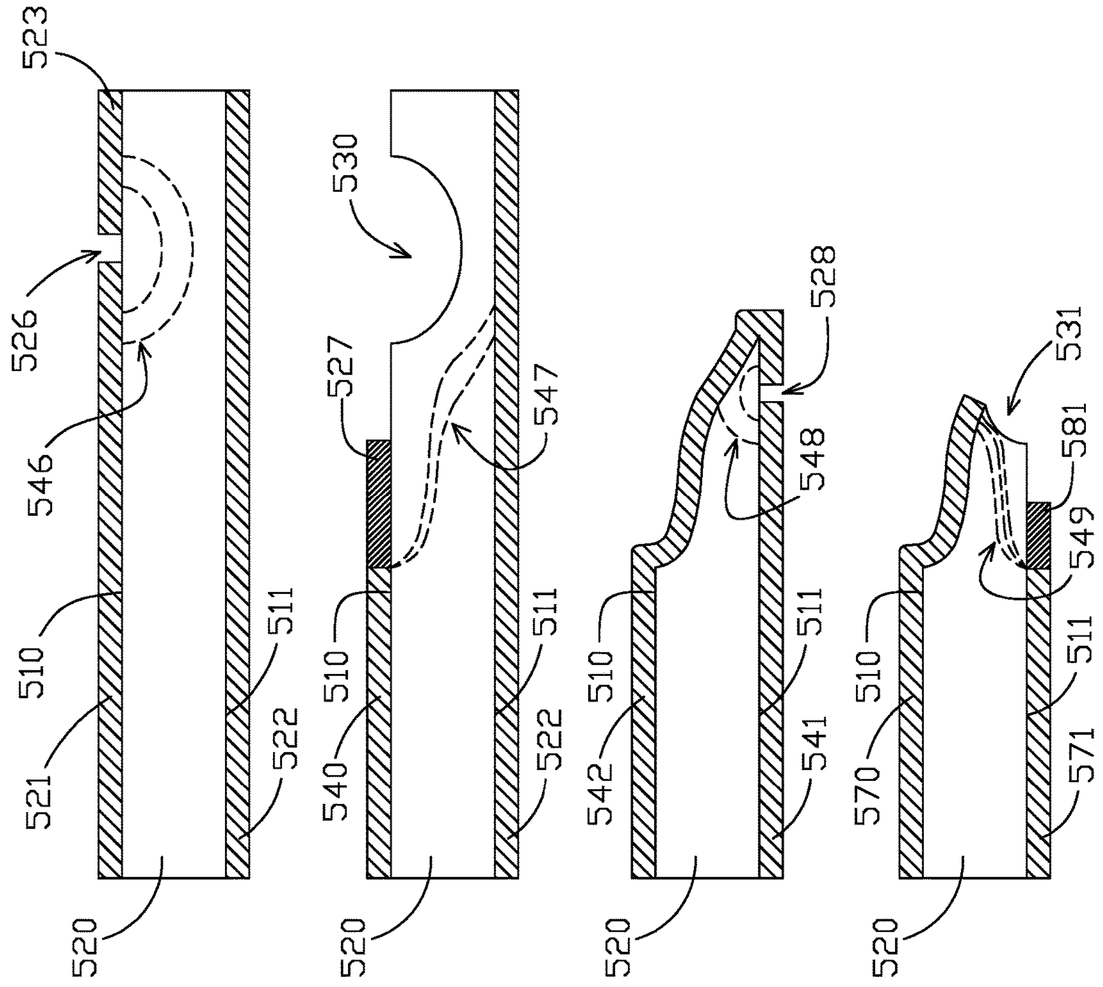
FIGS. 24-27 illustrate stages of fabrication of a blade of a cutting tool according to an example of this disclosure.

FIG. 25 shows the metal base 520 after the first exposure to an etchant solution. As shown, a first void 530 is formed. A fourth mask 540 is applied to the first side 510. In contact with, and distally from the fourth mask 540, a first variable permeability mask 527 is applied to the first side 510. Removal lines 547, partially overlapped by the first variable permeability mask 527, indicate the progression of material removal in a second etching step. As represented by removal lines 547, the etching of void 530 following the application of variable permeability mask 527 creates a blade surface with a complex profile including two inflection points defined by the junctures of a distal concave portion, an intermediate convex portion and a more proximal concave portion. Through further etching, as shown in FIG. 26, the distal concave portion may be removed to leave a complex profile including a single inflection point defined by the juncture of a distal convex portion and a more proximal concave portion.

FIG. 26 shows the metal base 520 after the second application of etchant solution followed by the application of masking layers. A fifth mask 541 is applied to the second side 511 of the metal base 520. A sixth mask 542 is applied to the first side 510 of the metal base 520. A second window 528 is formed between the fifth mask 541 and the sixth mask 542. It is noted that the sixth mask 542 may be folded around the distal end of the metal base 520 or a different layer of masking material could be applied to the second side 511 distally of the second window 528. Removal lines 548 indicate the progression of material removal by exposure to etchant solution through the second window 528. The etching represented by removal lines 548 further functions to remove the most distal convex portion represented by removal lines 547.

FIG. 27 shows the metal base 520 after a third exposure to etchant solution and re-masking. A seventh mask 570 is provided on the first side 510 of the metal base 520. The seventh mask 570 may be a new mask applied after removal of the sixth mask 542 or may be a cut down version of the sixth mask 542. An eighth mask 571 is provided along the second side 511. The eighth mask 571 may replace the fifth mask 541 or may be a cut down version of the fifth mask 541. In contact with the eighth mask 571, and extending distally of the eighth mask 571, is a second variable permeability mask 581. Removal lines 549 are partially overlapped by the second variable permeability mask 581. Based on the duration of etchant exposure, the profile of the blade can be selected per the removal lines 549. In some specific examples, the tip angle of the finished blade may be between about 20 degrees and about 35 degrees. As represented by removal lines 549, the etching of void 531 following the application of variable permeability mask 581 creates a blade surface with a complex profile including an inflection point defined by the juncture of a distal concave portion and a more proximal convex portion. Thus, in contrast to previous examples, both blade surfaces in the example of FIG. 27 provide a complex profile including at least one inflection point at the juncture of a convex portion and a concave portion.

Figures 28, 29, 30:
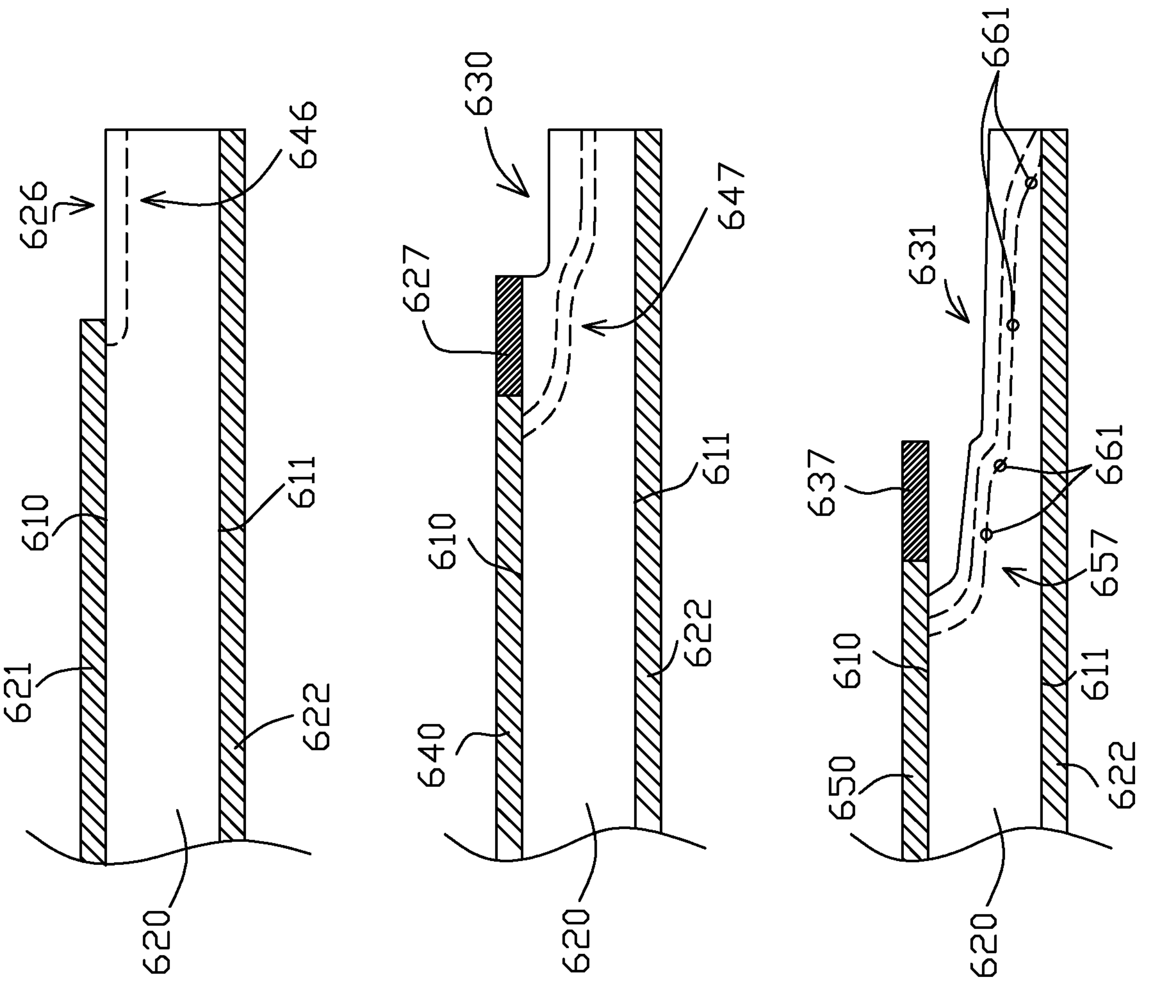
FIGS. 28-30 illustrate stages of fabrication of a blade of a cutting tool according to an example of this disclosure.

FIGS. 28-30 show a three stage etching process. Over multiple etching steps, masking material is removed and variable permeability masking is applied as shown to selectively slow down the etching process. In particular, FIG. 28 shows a metal base 620 that is masked with a first mask 621, which may include resist layers, such as a dry film photoresist layer. The process includes applying a first mask 621 to a first side 610 of the metal base 620, applying a second mask 622 to a second side 611 of the metal base 620. The first mask 621 only covers a portion of first side 610, leaving exposed area 626. Removal lines 646 show the progression of material removal from etchant solution through the exposed area 626. A trench, represented by void 630, is formed on a distal end of the metal base 620 in a first etching step. The trench can be formed to be 0.001 inches deep, for example.

FIG. 29 shows the metal base 620 after the first exposure to an etchant solution and shows the placement of masking layers before a second etching step while the removal lines 647 metal base 620 shown reflects the state of the metal base 620 during and after the second etching step. The process includes applying a third mask 640 to the first side 610. The process also includes applying, in contact with, and distally from the third mask 640, a first variable permeability mask 627, which may include a dry film photoresist layer, to the first side 610. Removal lines 647, partially overlapped by the first variable permeability mask 627, indicate the progression of material removal in a second etching step. In the second etching step, the etching can recede the metal base 620 about 0.0096 inches back from the trench represented by void 630 and about 0.0035 inches deep. As represented by removal lines 647, the etching of void 630 following the application of variable permeability mask 627 creates a surface with a complex profile including two inflection points defined by the junctures of a distal concave portion, an intermediate convex portion and a more proximal concave portion.

FIG. 30 shows the metal base 620 after the second application of etchant solution followed by the application of masking layers. A fourth mask 650 is applied to the first side 610 of the metal base 620. In contact with, and distally from the fourth mask 650, a second variable permeability mask 637, which may include a dry film photoresist layer, is applied to the first side 610. It is noted that a bottom resist layer, such as a dry film photoresist layer, forming mask 622 may be thicker than a top resist layer, such as a dry film photoresist layer, forming fourth mask 650 and a second variable permeability mask 637. Removal lines 657 indicate the progression of material removal by exposure to etchant solution. In the third etching step, the etching can recede the metal base 620 about 0.0196 inches back from the previous proximal edge of etched material and about 0.0035 inches deep. As represented by removal lines 657, the etching of void 631 following the application of variable permeability mask 637 creates a blade surface with a complex profile including four inflection points 661 defined by the junctures of a distal concave portion, a first intermediate convex portion, an intermediate concave portion, a second intermediate convex portion, and a proximal concave portion. Additional etching may remove one or more of these portions, such as the distal concave portion, leaving a distal convex portion. As this example illustrates, it is possible to form any number of inflection points in a surface by remasking between multiple etching stages.

Figure 31:
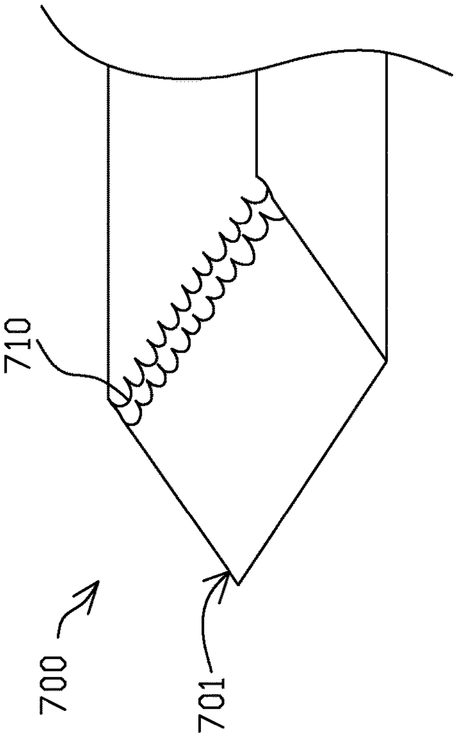
FIGS. 31 and 32 illustrate stages of removal of a scalloped surface during fabrication of a blade of a cutting tool according to an example of this disclosure.

FIG. 31 shows an image of a cutting tool 700 after one or more etching steps. A variable permeability mask was used to form the single bevel blade 701. The erosion of metal around the variable permeability mask forms a scalloped surface 710 as shown. The scalloped surface 710 may occurs adjacent the side of a variable permeability mask including narrowing gaps, such variable permeability mask 27, while the differences in material removed during etching across a variable permeability mask are less pronounced as the gaps of the variable permeability mask widen. Such a scalloped surface may not be preferred, and a subsequent etching step may be desirable to smooth out the scalloped surface created by the variable permeability mask.

The center-to-center distance between adjacent scallops on the scalloped surface corresponds to the center-to-center spacing of projections of a variable permeability mask used to form a beveled surface of a cutting edge. For example, a center-to-center distance between adjacent scallops on the scalloped surface may be at least 50 micrometers, such as about 150 micrometers or larger than 150 micrometers. In contrast, larger features, such as serrations or a curved blade surface would correspond to a multitude of projections of a variable permeability mask. In one example, a center-to-center distance between adjacent serrations of the cutting edge may be made up of three or more projections of a variable permeability mask. For example, a center-to-center distance between adjacent serrations of the cutting edge may be at least 500 micrometers. In this manner, the scallops on scalloped surface 710 result from a variable permeability mask having a comb profile, and can be distinguished from larger features such as serrations or a curved blade surface that correspond to a multitude of projections of a variable permeability mask.

Figure 32:
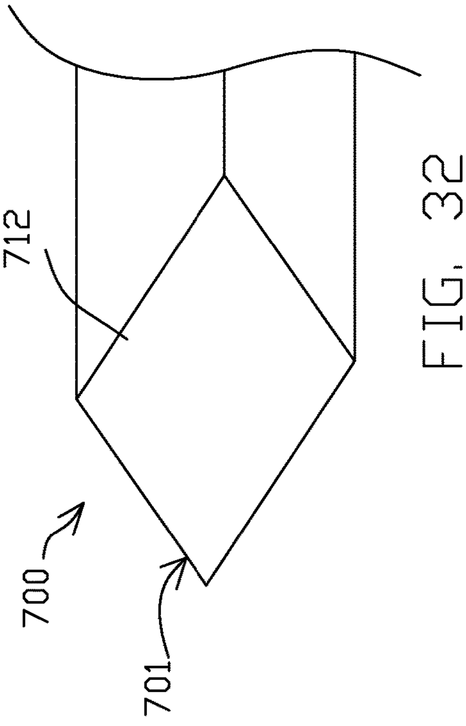

FIG. 32 shows the single bevel blade 701 after removal of the scalloped surface 710 of the blade. The scalloped portion can be removed by exposure to an etchant solution, leaving straight edge 712. Part of the blade, including the tip of the blade may be masked during removal of the scalloped portion to protect the profile of the blade. Alternatively, the blade may be unmasked distally of the scalloped portion during the removal of the scalloped portion, the further etching forming the blade into the desired profile.

In some examples, the scalloped portions may be smoothed by masking the depressions of the scalloped portions, e.g., by applying a mask to the entire surface of scalloped surface 710 and then removing portions of the mask from the raised portions of scalloped surface 710, or by precisely positioning the mask to cover only the scalloped portions. Such examples may facilitate chemical removal of scalloped surfaces within minimal additional material removal beyond the raised portions of the scalloped surface 710.

Figure 33:
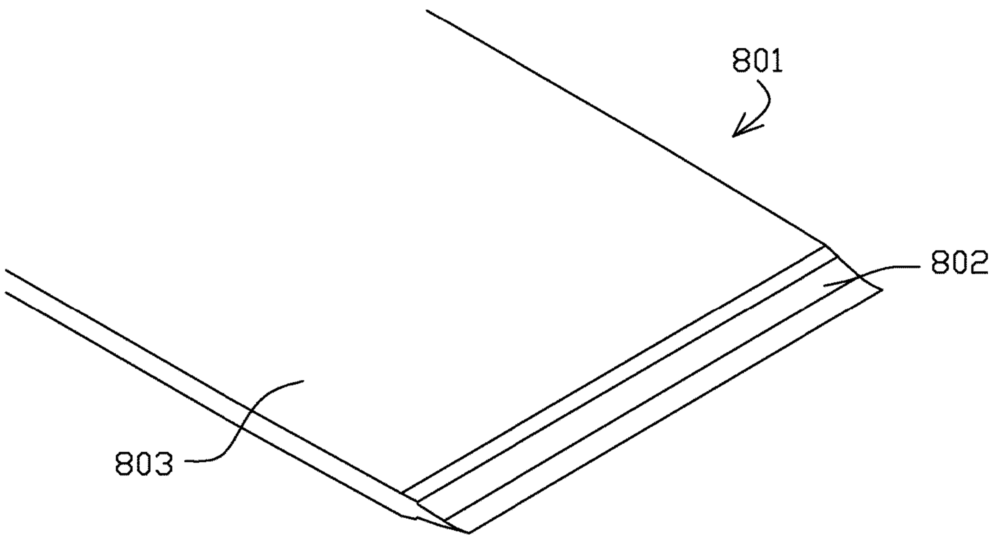
FIGS. 33-36 illustrate a cutting tool formed using chemical etching techniques according to an example of this disclosure.
Figure 34:
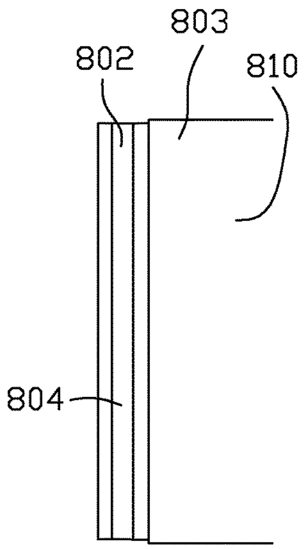
Figure 35:
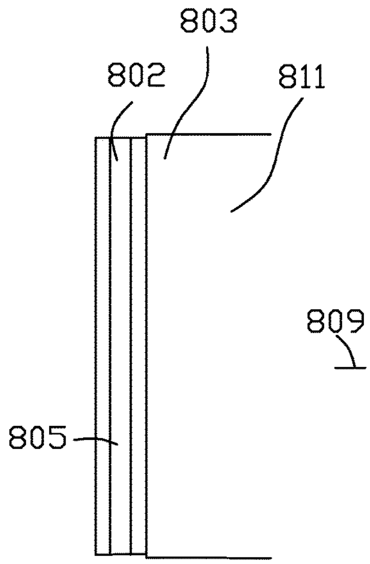

FIGS. 33-35 illustrate cutting tool 801. As shown in FIG. 33, the cutting tool 801 includes a blade 802 and a main body 803. The blade 802 is the cutting surface of the cutting tool 801. The main body 803 provides structural support to the blade 802. The main body 803 forms the vast majority of the cutting tool 801 (e.g., by mass and size) while the blade 802 forms a much smaller portion of the cutting tool 801. The main body 803 may be mechanically attached to a handle and/or an automated cutting mechanism. The blade 802 is typically positioned at the end of the cutting tool 801, such as at the distal tip of the cutting tool 801. The cutting tool 801 can be formed from metal, such as stainless steel; however other types of metals are possible. The cutting tool 801 can be a unitary metal body. For example, a single metal sheet can be chemically etched to form the cutting tool 801 (and possibly multiple cutting tools).

FIG. 34 shows a detailed view of the blade 802. Specifically, FIG. 34 shows a first side 810 of the main body 803 and a first side 804 of the blade 802. FIG. 35 shows another detailed view of the blade 802 but from an opposite orientation as compared to FIG. 34. Specifically, FIG. 35 shows a second side 811 of the main body 803 and a second side 805 of the blade 802. The first side 804 is opposite the second side 805. The first side 804 can be a top side of the blade 802 while the second side 805 can be a bottom side of the blade 802, although in many applications blades are not considered to have top and bottom orientations.

Figure 36:
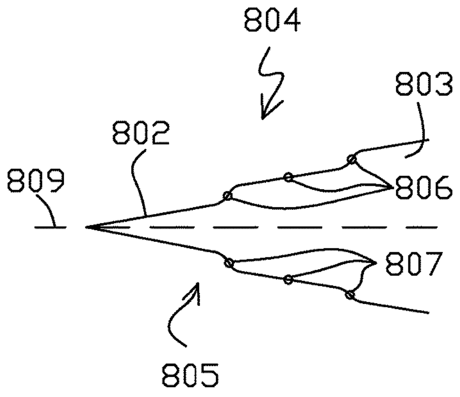

FIG. 36 shows a side view of the blade 802. As can be seen in FIG. 36, the main body 803 includes a first side 810 and a second side 811 opposite the first side 810. The first side 804 and the second side 805 have similar profiles, and may be symmetric or approximately symmetric. For example, first side 804 has a complex profile including three inflection points 806 defined by the junctures of a distal concave portion, an intermediate convex portion, an intermediate concave portion, and a proximal convex portion. Similarly, second side 805 has a complex profile including three inflection points 807 defined by the junctures of a distal concave portion, an intermediate convex portion, an intermediate concave portion, and a proximal convex portion. The complex profiles of first side 804 and second side 805 including inflection points 806, 807 are formed from a multi-stage etching process including remasking between etching stages, e.g., as described with respect to FIGS. 37-39.

The first side 810 and the second side 811 can represent parallel planes. The main body 803 includes a centerline 809. The centerline 809 of the main body 803 can be parallel and equidistant from the top surface 810 and the bottom surface 811 of the main body 803. The blade 802 includes a centerline aligned with the tip of the blade 802. The tip is the distal-most part of the blade 802. The centerline of the blade 802 can extend parallel with the profile of the main body 803, such as by being parallel with the first side 810 and the second side 811 of the main body 803. As shown in FIG. 36, the first side 804 and the second side 805 have similar profiles, such as symmetric or approximately symmetric profiles resulting from substantially similar masking and etching steps for the first side 804 and the second side 805. The different profiles result in no offset between the centerline 809 of the main body 803 and the centerline of the blade 802.

Figure 37:
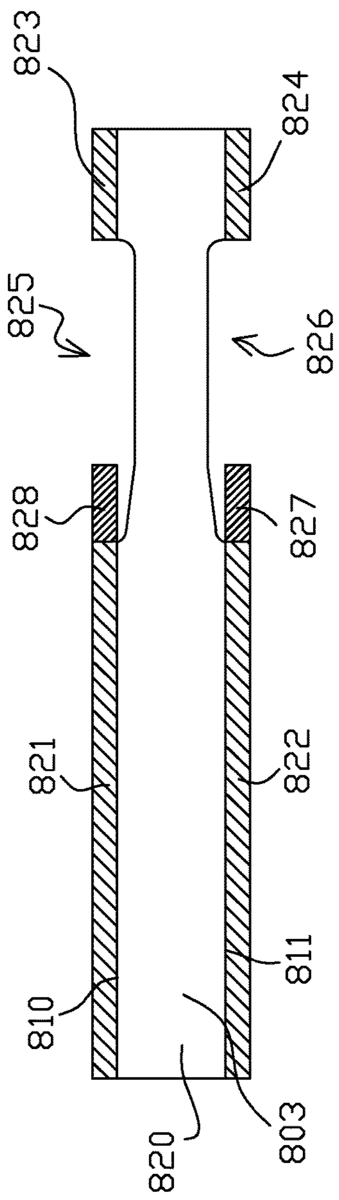
FIGS. 37-39 illustrate stages of fabrication of a blade of the cutting tool of FIGS. 33-36 according to an example of this disclosure.
Figure 38:
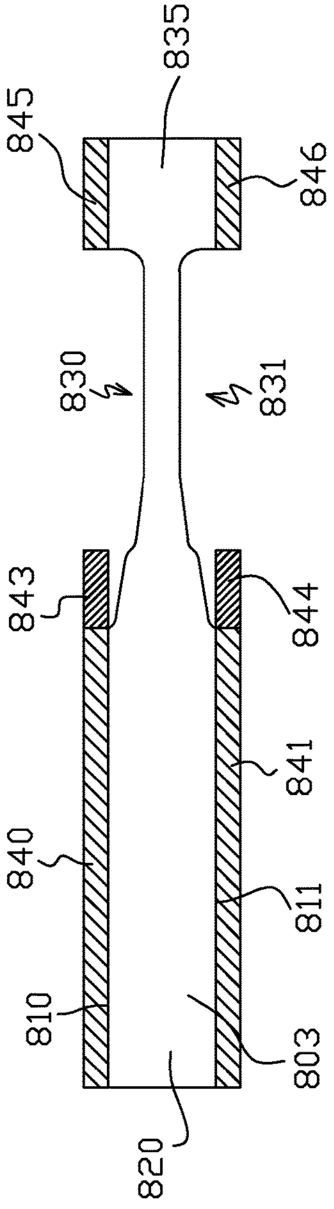
Figure 39:
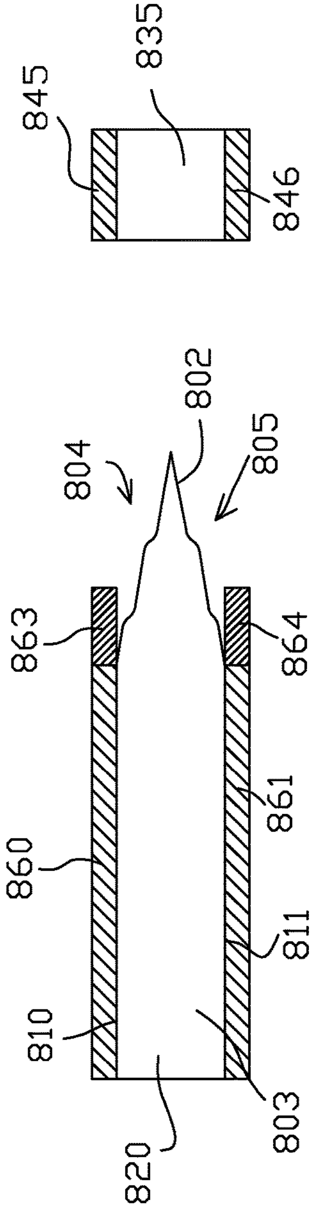

FIGS. 37-39 show stages of fabrication of the blade 802. FIG. 37 shows a side view of the metal base 820 after application of a plurality of masks. The metal base 820 can be a sheet of stainless steel or other metal. The metal base 820 can be a thin, planar portion of metal. Specifically, a first mask 821 was applied to the first side 810 of the main body 803, a second mask 822 was applied to the second side 811 of the main body 803, the third mask 823 was applied coplanar with the first mask 821, and a fourth mask 824 was applied coplanar with the second mask 822. A first variable permeability mask 828 was applied coplanar with the first mask 821. A proximal end of the first variable permeability mask 828 can be continuous with a distal end of the first mask 821 such that they are part of the same layer. Alternatively the first variable permeability mask 828 and the first mask 821 can be formed by different layers of masking material. A second variable permeability mask 827 was applied coplanar with the second mask 822. A proximal end of the second variable permeability mask 827 can be continuous with a distal end of the second mask 822 such that they are part of the same layer. Alternatively the second variable permeability mask 827 and the second mask 822 can be formed by different layers of masking material.

The first mask 821 and the third mask 823 can be part of the same layer of masking material, or can be different layers entirely. Likewise, the second mask 822 and the fourth mask 824 can be part of the same layer of masking material or can be different layers entirely. Each of the first mask 821, the second mask 822, the third mask 823, and the fourth mask 824 can be regarded as a solid mask which does not comprise any voids within the respective mask and which is not permeable to etchant solution. A first window 825 is formed between the first mask 821 and the third mask 823. A section of the metal base 820 is exposed through the first window 825. A second window 826 is formed between the second mask 822 and the fourth mask 824. A section of the metal base 820 is exposed through the second window 826.

The example shown in FIG. 37 can be exposed to etchant solution. The first window 825 and the second window 826 expose respective portions of the metal base 820 to the etchant solution while the first variable permeability mask 827 partially protects a portion of the metal base 820 underlying the variable permeability masks 827, 828, which serves to expose the portion of the metal base 820 to the etchant solution but in a limited manner to slow the rate of material removal.

FIG. 38 shows a side view of the metal base 820 after exposure to etchant solution and mask replacement. As shown in FIG. 38, a first void 830 has been formed on the first side 810 of the metal base 820. The first void 830 results from etching material passing through the first window 825 of the example of FIG. 37, and forms a concave surface. As further shown in FIG. 38, a second void 831 on the second side 811 of the metal base 820 forms another concave surface. The second void 831 results from etching material passing through the window 826 of FIG. 37. It is noted that the first void 830 and the second void 831 have profiles that are not distally and proximally symmetrical. Specifically the proximal sides of the voids 830, 831 have shallower slopes than the distal sides of the voids 830, 831. The shallower slope of the proximal sides are due to the first variable permeability masks 827, 828 slowing the removal of metal material during the etchant solution exposure. Faster exposure would have formed a more abrupt transition resulting in a thinner blade 802.

The first void 830 is formed to begin removal of a residual end 835 of the metal base 820. The first void 830 and the second void 831 can be trenches that extend laterally (e.g., orthogonal to the proximal-distal axis). The removal of the entirety of the residual end 835 is desired; however it is preferred not to remove the residual end 835 in a single step as this would require a prolonged exposure to etchant material which would jeopardize the formation of the preferred profile of the blade 802. As such, the blade 802 can be formed using masking, etching, and re-masking and re-etching steps.

FIG. 38 further shows the metal base 820 after the application of a plurality of masks. A fifth mask 840 is applied to the first side of the metal base 820. A sixth mask 841 is applied to the second side 811 of the metal base 820. An optional seventh mask 845 and eighth mask 846 may be applied to the residual end 835, although these masks are not required as the residual end 835 is to be removed such that the profile of residual end 835 is inconsequential. A third variable permeability mask 843 is applied to the first side 810 of the metal base 820. The third variable permeability mask 843 can be separate from, or continuous with, the fifth mask 840. The third variable permeability mask 843 can be coplanar with the fifth mask 840. The third variable permeability mask 843 can have a similar configuration to the first variable permeability mask 828. A fourth variable permeability mask 844 is applied to the first side 810 of the metal base 820. The fourth variable permeability mask 844 can be separate from, or continuous with, the sixth mask 841. The fourth variable permeability mask 844 can be coplanar with the sixth mask 841. The fourth variable permeability mask 844 can have a similar configuration to the second variable permeability mask 827.

As discussed herein, a variable permeability mask can slow the etching process to form a preferred blade profile. The application of third variable permeability mask 843 and etching of first void 830 creates a complex profile for first side 804 including an inflection point defined by the juncture of a distal convex portion of first side 804 and a more proximal concave portion of first side 804. Likewise, the application of fourth variable permeability mask 844 and etching of second void 831 creates a complex profile for second side 805 including an inflection point defined by the juncture of a distal convex portion of second side 805 and a more proximal concave portion of second side 805.

FIG. 39 shows a side view of the metal base 820 after exposure to etchant solution and mask replacement. The removal of the entirety of the residual end 835 has occurred through the further etching step. A ninth mask 860 is applied to the first side of the metal base 820. A tenth mask 861 is applied to the second side 811 of the metal base 820. A fifth variable permeability mask 863 is applied to the first side 810 of the metal base 820. The fifth variable permeability mask 863 can be separate from, or continuous with, the ninth mask 860. The fifth variable permeability mask 863 can be coplanar with the ninth mask 860. The fifth variable permeability mask 863 can have a similar configuration to the first variable permeability mask 828. A sixth variable permeability mask 864 is applied to the first side 810 of the metal base 820. The sixth variable permeability mask 864 can be separate from, or continuous with, the tenth mask 861. The sixth variable permeability mask 864 can be coplanar with the tenth mask 861. The sixth variable permeability mask 864 can have a similar configuration to the second variable permeability mask 827.

As discussed herein, a variable permeability mask can slow the etching process to form a preferred blade profile. The application of fifth variable permeability mask 863 and etching of first void 830 creates a complex profile for first side 804 including three or four inflection points defined by the junctures of an optional distal concave portion, a first intermediate convex portion, an intermediate concave portion, a second intermediate convex portion, and an optional proximal concave portion (not shown) of first side 804. Likewise, the application of sixth variable permeability mask 864 and etching of second void 831 creates a complex profile for second side 805 including three or four inflection points defined by the junctures of an optional distal concave portion, a first intermediate convex portion, an intermediate concave portion, a second intermediate convex portion, and an optional proximal concave portion (not shown) of second side 805.

As shown in FIGS. 37-39, the second side 805 of the blade 802 is formed into its final state through one etching step and then masked to protect the second side 805 while the first side 804 and the second side 805 are subjected to three iterations of masking and etching of the blade 802 to form complex profiles. Assuming the masking and etching steps are similar for the first side 804 and the second side 805, the first side 804 and the second side 805 of the finished blade 802 may be symmetrical or approximately symmetrical about main body 803 centerline 809 (FIG. 36).

While multiple examples are disclosed, still other examples within the scope of the present disclosure will become apparent to those skilled in the art from the detailed description provided herein, which shows and describes illustrative examples. Accordingly, the drawings and detailed description are to be regarded as illustrative in nature and not restrictive. Features and modifications of the various examples are discussed herein and shown in the drawings. While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

What is claimed is:

1. A chemically etched cutting tool comprising:

a metal base having a centerline dividing a first side and a second side; and a chemically etched blade on the metal base, the chemically etched blade forming a cutting edge at an intersection of a first side of the chemically etched blade that corresponds to the first side of the metal base and a second side of the chemically etched blade that corresponds to the second side of the metal base, wherein the first side of the chemically etched blade includes at least two repeating profiles, each profile includes a proximal convex portion and a distal concave portion, with an inflection point between the cutting edge and the proximal convex portion and between the proximal convex portion and the distal concave portion, and wherein the second side of the chemically etched blade includes at least two repeating profiles so that the first side of the chemically etched blade and the second side of the chemically etched blade are symmetric at the centerline of the metal base.

2. The chemically etched cutting tool of claim 1, wherein at least one of the first side of the chemically etched blade and the second side of the chemically etched blade includes a scalloped surface.

3. The chemically etched cutting tool of claim 2, wherein the scalloped surface was formed by etching the metal base through at least one variable permeability mask.

4. The chemically etched cutting tool of claim 3, wherein the at least one variable permeability mask comprises a mask having a comb profile.

5. The chemically etched cutting tool of claim 2, wherein the cutting edge is a serrated cutting edge, and wherein a distance between adjacent serrations of the cutting edge is at least three times larger than a distance between adjacent scallops on the scalloped surface.

6. The chemically etched cutting tool of claim 5, wherein the distance between adjacent scallops on the scalloped surface is at least 50 micrometers and the distance between adjacent serrations of the cutting edge is at least 500 micrometers.

7. The chemically etched cutting tool of claim 1, wherein the metal base is a stainless steel metal base.

8. The chemically etched cutting tool of claim 1, wherein cutting edge is a serrated cutting edge.

9. The chemically etched cutting tool of claim 1, wherein the at least one inflection point between the concave portions and the convex portions of the first side includes at least two inflection points between the concave portions and the convex portions.

10. The chemically etched cutting tool of claim 1, wherein the at least one inflection point between the concave portions and the convex portions of the second side includes at least two inflection points between the concave portions and the convex portions.

11. The chemically etched cutting tool of claim 1, wherein the first and second sides of the chemically etched blade represent two bevels located the first and second sides of the metal base.

12. The chemically etched cutting tool of claim 1, wherein a thickness of the metal base is less than 1000 micrometers.

13. The chemically etched cutting tool of claim 1, wherein a thickness of the metal base is less than 500 micrometers.

14. The chemically etched cutting tool of claim 1, wherein a thickness of the metal base is between 250 micrometers and 500 micrometers.

15. The chemically etched cutting tool of claim 1, wherein the first side of the chemically etched blade and the second side of the chemically etched blade form a tip angle between 20 degrees and 35 degrees.

* * * * *